(12) United States Patent
Mozer

(10) Patent No.: US 8,321,219 B2
(45) Date of Patent: Nov. 27, 2012

(54) SYSTEMS AND METHODS OF PERFORMING SPEECH RECOGNITION USING GESTURES

(75) Inventor: Todd F. Mozer, Los Altos Hills, CA (US)

(73) Assignee: Sensory, Inc., Santa Clara, CA (US)

( * ) Notice: Subject to any disclaimer, the term of this patent is extended or adjusted under 35 U.S.C. 154(b) by 1084 days.

(21) Appl. No.: 12/238,287

(22) Filed: Sep. 25, 2008

(65) Prior Publication Data

US 2009/0150160 A1    Jun. 11, 2009

Related U.S. Application Data

(63) Continuation-in-part of application No. 11/973,140, filed on Oct. 5, 2007, now Pat. No. 8,036,901.

(51) Int. Cl.
*G10L 15/00* (2006.01)
*G10L 21/00* (2006.01)

(52) U.S. Cl. ............ 704/236; 345/7; 345/158; 382/103; 704/231; 704/270; 704/272; 704/275; 715/767

(58) Field of Classification Search ............... 704/236
See application file for complete search history.

(56) References Cited

U.S. PATENT DOCUMENTS

| 6,292,158 | B1 * | 9/2001 | Amafuji et al. ................. 345/7 |
| 2002/0135618 | A1 * | 9/2002 | Maes et al. ................ 345/767 |
| 2003/0046087 | A1 | 3/2003 | Johnston et al. |
| 2006/0013440 | A1 | 1/2006 | Cohen et al. |

OTHER PUBLICATIONS

International Search Report (from corresponding PCT application), PCT/US08/77742, mailed Dec. 2, 2008.

* cited by examiner

*Primary Examiner* — Justin Rider
(74) *Attorney, Agent, or Firm* — Fountainhead Law Group P.C.

(57) ABSTRACT

Embodiments of the present invention improve methods of performing speech recognition using human gestures. In one embodiment, the present invention includes a speech recognition method comprising detecting a gesture, selecting a first recognition set based on the gesture, receiving a speech input signal, and recognizing the speech input signal in the context of the first recognition set.

23 Claims, 11 Drawing Sheets

SYSTEMS AND METHODS OF PERFORMING SPEECH RECOGNITION USING GESTURES

CROSS REFERENCE TO RELATED APPLICATIONS

This application is a continuation-in-part of and claims the benefit of priority from U.S. patent application Ser. No. 11/973,140, filed Oct. 5, 2007 now U.S. Pat. No. 8,036,901, issued Oct. 11, 2011, entitled "Systems and Methods of Performing Speech Recognition Using Sensory Inputs of Human Position," the disclosure of which is hereby incorporated herein by reference.

BACKGROUND

The present invention relates to speech recognition, and more particularly, to systems and methods of performing speech recognition using gestures.

Electronic devices have become more readily available to the public and people find themselves interfacing with many different electronic devices during their daily lives. Historically, the adoption of an electronic device required the user to spend considerable time learning to interface with the device. The advent of menu driven interfaces helped to alleviate some of the tedium of learning to interface with an electronic device, but this method of interfacing with an electronic device still required a person to learn where the menus were and how to use them. More recently, the tactile and motion interfaces have attempted to make the experience of using an electronic device more intuitive. Although the advancements in tactile and motion devices have improved the experience of interfacing with an electronic device, the user is still constrained by the use of visual cues to maneuver through the options and functions of the electronic device. Due to this limitation, the user may still be required to spend a great deal of time learning to interface with the electronic device.

Many electronic devices have required button pushes to initiate particular functions on the electronic device. This may be cumbersome while a person is walking along a crowded street or operating a motor vehicle. Current "hands free" systems allow for a user to be unencumbered by the mechanical placement of the device in proximity of the user's ear, but the functions of the electronic device are limited by the number of buttons and mechanical interfaces available. Speech recognition would help improve the interface immensely by allowing the user to tell the device what task was desired. Historically however, speech recognition alone has been problematic due to the false triggering which may occur due to normal conversation. In this way, the historical speech recognition methods may simply add to the frustration of interfacing with an electronic device rather than facilitate its use. These factors, as well as many others, have prevented the use of speech recognition in electronic devices.

The present invention solves these and other problems with systems and methods of performing speech recognition using gestures.

SUMMARY

Embodiments of the present invention improve methods of performing speech recognition using sensory inputs of human position. In one embodiment, the present invention includes a speech recognition method comprising sensing a change in position of at least one part of a human body, selecting a recognition set based on the change of position, receiving a speech input signal, and recognizing the speech input signal in the context of the first recognition set.

In one embodiment, the change of position includes a change in orientation.

In one embodiment, the change of position includes a change in direction.

In one embodiment, the change of position includes a portion of a human hand proximate with a surface.

In one embodiment, the change of position includes motion.

In one embodiment, the change of position occurs within a three foot radius of an initial position of the at least one part of the human body.

In one embodiment, the speech input signal is a portion of an utterance.

In one embodiment, the recognizing includes choosing an element from the first recognition set.

In one embodiment, the recognizing includes using the first recognition set to weight a set of likelihoods, wherein the first recognition set includes segments of speech.

In one embodiment, the method further comprises initiating a state of a computer program, and selecting a state recognition set based on the state of the computer program, wherein the selecting of the first recognition set includes finding a subset of the state recognition set.

In one embodiment, the method further comprises changing the state of the computer program according to the recognition result.

In one embodiment, the speech input signal includes digital data.

In one embodiment, the sensing includes the use of a tactile sensor.

In one embodiment, the sensing includes the use of a gyroscope.

In one embodiment, the sensing includes the use of sonic signaling data.

In one embodiment, the sensing includes the use of ultrasonic signaling data.

In one embodiment, the present invention includes a speech recognition method comprising detecting a gesture of at least one part of a human body. The method further includes selecting a first recognition set based on the gesture, receiving a speech input signal, and recognizing the speech input signal in the context of the first recognition set. The recognizing results in a recognition result.

In one embodiment, the method further comprises further comprising initiating a program corresponding to the gesture.

In one embodiment, the gesture is a hand gesture. The step of detecting the gesture includes detecting a portion of a human hand.

In one embodiment, the gesture includes motion.

In one embodiment, the step of detecting includes the use of infrared light emissions.

In one embodiment, the change of position occurs within a three foot radius of an initial position of the at least one part of the human body.

In one embodiment, the speech input signal is a portion of an utterance.

In one embodiment, the recognizing includes choosing an element from the recognition set.

In one embodiment, the gesture is from a set of gestures corresponding to a set of recognition sets. Each recognition set corresponds to at least one instruction executed by a microprocessor.

In one embodiment, the recognizing includes using the recognition set to weight a set of likelihoods. The first recognition set includes segments of speech.

In one embodiment, the method further comprises initiating a state of a computer program corresponding to the gesture.

In one embodiment, the method further comprises changing the state of the computer program according to the recognition result.

In one embodiment, the method further comprises reducing a level of sound generation in response to the step of detecting the gesture.

In one embodiment, the method further comprises detecting a second gesture.

In one embodiment, the method further comprising adjusting a parameter of the program corresponding to the second gesture.

In one embodiment, the method further comprises providing a voice prompt corresponding to the gesture.

In one embodiment, the method further comprises providing a visual cue corresponding to the new state of the program.

In one embodiment, the invention includes a speech recognition system comprising a controller, a gesture detector, a speech recognizer, an audio user interface, and a plurality of output devices. The gesture detector is coupled to provide signals to the controller. The signals correspond to a gesture. The speech recognizer has access to a plurality recognition sets. The speech recognizer is coupled to provide recognition results to the controller. The audio user interface is coupled to receive a speech input and is coupled to provide audio signals to the speech recognizer. The audio signals correspond to the speech input. The plurality of output devices are coupled to the controller. A recognition set is selected from the plurality of recognition sets. The recognition set corresponds to the gesture. The controller provides signals to at least one output device of the plurality of output devices. The signals correspond to the gesture and the recognition results.

In one embodiment, the gesture detector includes a plurality of infrared detectors arranged to provide signals corresponding to the gesture.

In one embodiment, at least a portion of the plurality of output devices are coupled through a wireless network.

In one embodiment, the controller along with the gesture detector recognize the gesture from a set of gestures. Each gesture corresponds to a recognition set. Each recognition set corresponds to at least one output device of the plurality of output devices.

In one embodiment, at least one of the output devices of the plurality of output devices is a speech synthesizer that provides a verbal prompt corresponding to the gesture.

In one embodiment, the present invention includes a speech recognition method. The method comprises detecting, receiving, recognizing, weighting, and determining. The detecting includes detecting a gesture of at least one part of a human body. The receiving includes receiving a speech input signal. The recognizing includes recognizing the speech input signal in the context of a recognition set. The recognizing results in a first recognition result. The weighting includes weighting the first recognition result according to a function associated with the gesture. The determining includes determining a second recognition result based on the weighting.

In one embodiment, the method further comprising initiating a program corresponding to the gesture. The program includes the function associated with the gesture In one embodiment, the gesture is from a set of gestures corresponding to a plurality of functions. Each function corresponds to at least one gesture in the set of gestures.

DETAILED DESCRIPTION

Described herein are techniques for a content selection systems and methods using speech recognition. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
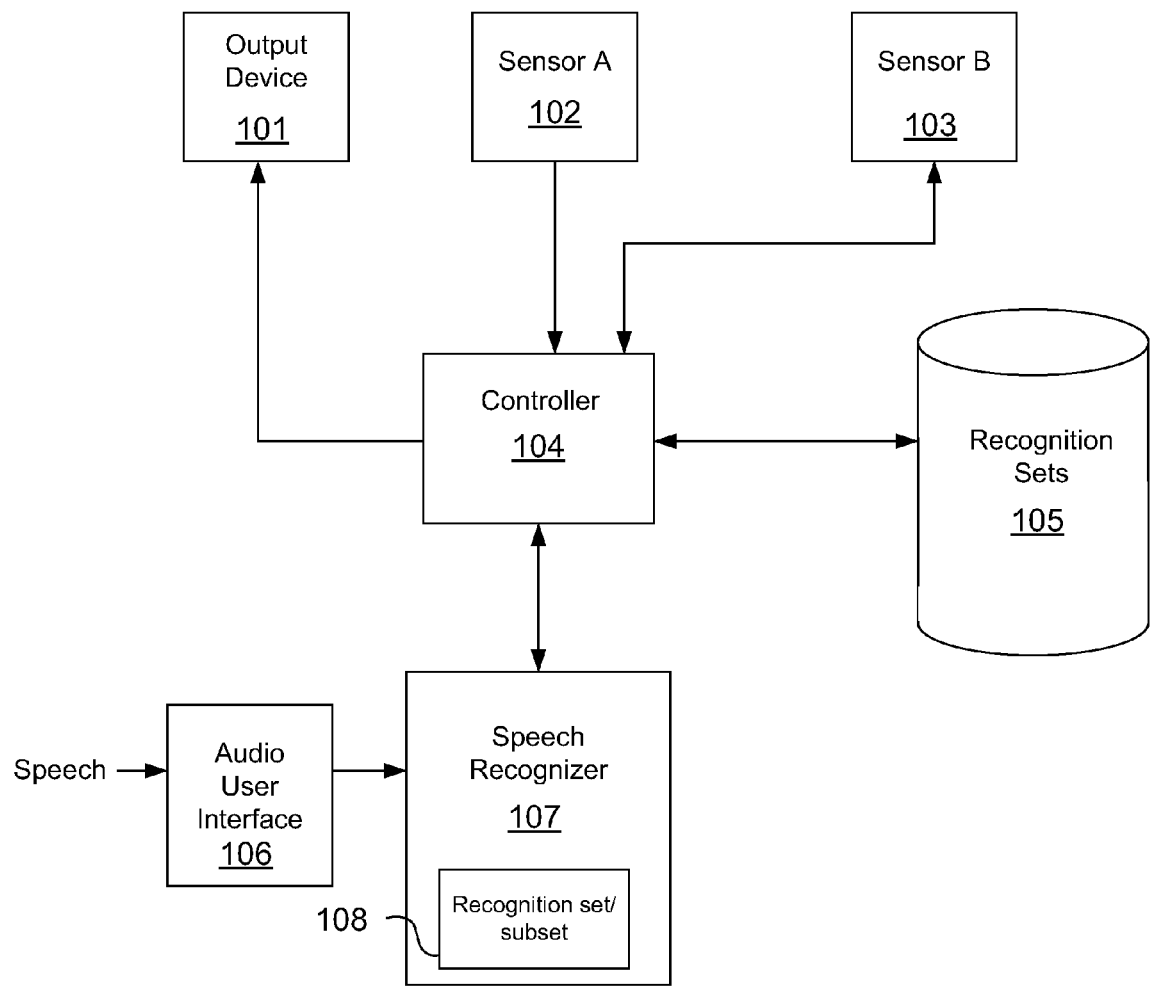
FIG. 1 illustrates a system for performing speech recognition using sensory inputs of human position according to one embodiment of the present invention.

FIG. 1 illustrates a system for performing speech recognition using sensory inputs of human position according to one embodiment of the present invention. System 100 includes an output device 101, a sensor A 102, a sensor B 103, a controller 104, a repository of recognition sets 105, an audio user interface 106, and a speech recognizer 107. The sensor A 102, sensor B 103, or both sensors receive signals indicating a change of position of at least one part of the human body. This change in position may include a change in orientation, direction, posture, or position, for example. The sensor may be sensing the direction a person's head is facing, for example. Also the sensor may be sensing the orientation of a person's hand, arm or leg, as another example. The change in position may also include motion. For example, the sensor may sense the speed at which the hand moves or how fast the feet are engaging a surface during a running exercise. The sensor may be a tactile sensor, a motion sensor, or any other sensor which can sense a change of position of at least one part of the human body. For example, a sensor may use sonic signaling data or ultra-sonic signaling data to sense a change in position. Another example of sensing is a surface computing device which may sense a finger moving substantially along the surface. Surface computing is the use of a specialized computer GUI (Graphic User Interface) in which traditional GUI elements are replaced by intuitive, everyday objects. Instead of a keyboard and mouse, the user interacts directly with a touch-sensitive screen, replicating the familiar hands-on experience of everyday object manipulation. In this example, the information of the relative positions of the arms, hands, and fingers in contact with the surface may be one type of input given by the sensor, and a finger motion on the surface may be another type of input given by the sensor. The change of position may be a portion of the human hand proximate with a surface (e.g. touching the surface). The sensor B 103 may be an active sensor which may be configured to retrieve the information desired. For example, sensor B 103 may be an image sensor which may be configured to a bright light environment or a dark environment.

Controller 104 is coupled to sensor A 102 and/or sensor B 103. The controller receives the signals regarding changes in position of at least one part of a human body from at least one sensor. The controller is also coupled to select a first recognition set from repository of recognition sets 105 based on the change of position. The repository of recognition sets may be on a local hard drive, be distributed in a local network, or may be distributed across the internet, for example. The first recognition set may be a subset of another recognition set dictated by the state of the program running on the system. For example the, controller may be a game controller and may already have a recognition set selected corresponding to the state of the game. The recognition sets 105 may be word sets, segments of sounds, snippets of sounds, or representations of sounds. The controller is also coupled to a recognizer 107. The controller loads the first recognition set into the recognizer 107. A speech input is provided to the audio user interface 106. The audio user interface 106 converts the speech input into a speech input signal appropriate to be processed. This may be a conversion of the audio signal to a digital format, for example. The audio user interface 106 output is coupled to the recognizer 107. The speech recognizer 107 recognizes the speech input signal in the context of the first recognition set 108. The recognizer 107 may come up with a list of probable elements and weight the elements based on the segments of sounds in the first recognition set, for example. Alternately, the recognizer may simply use the elements in the first recognition set to compare to the speech input signal for a best match, for example. The smaller the first recognition set, the faster and more accurate the recognition can be. The controller receives the recognition result and processes the command or request. The controller is also coupled to an output device 101. The controller conveys the changes in the program flow to the output device 101. The output device 101 may be a video display which the controller may elect to depict a new state of a video game, for example. Also, the output device may be a control mechanism in a manufacturing line which the controller may command to change configuration, for example. Also, the output device 101 may be an audio output which the controller communicates alternatives to the user, for example.

Figure 2:
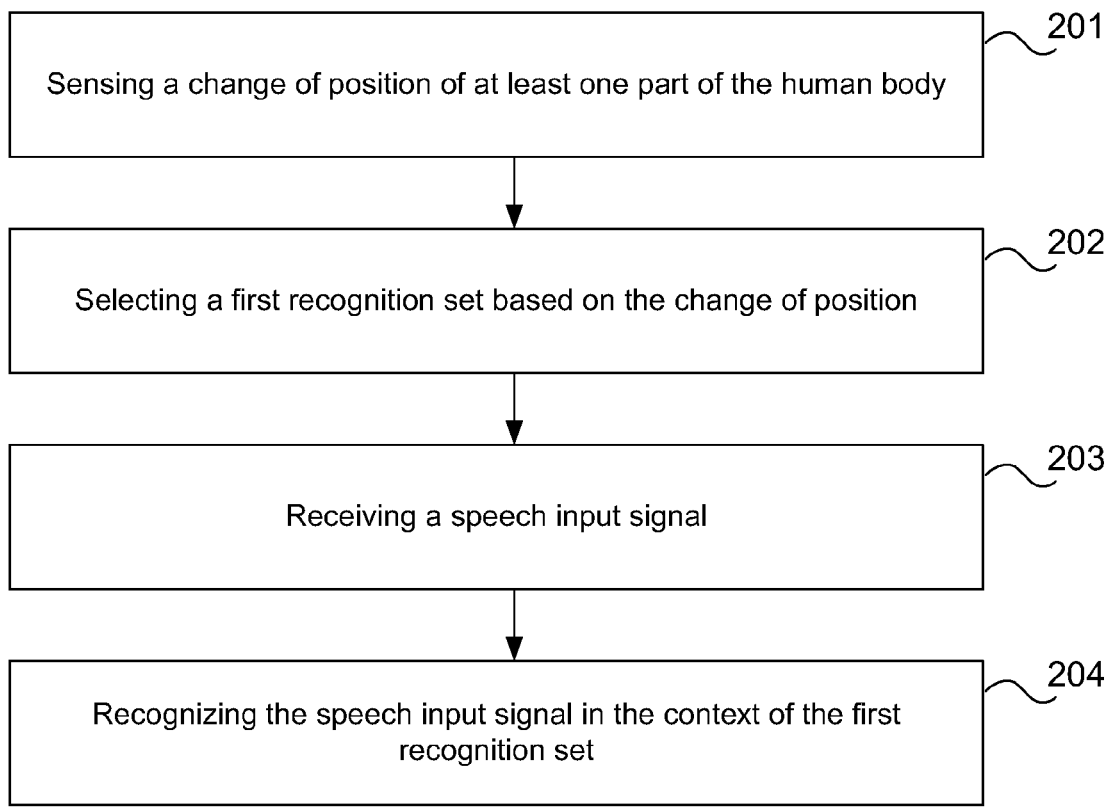
FIG. 2 illustrates a method for performing speech recognition using sensory inputs of human position according to one embodiment of the present invention.

FIG. 2 illustrates a method 200 for performing speech recognition using sensory inputs of human position according to one embodiment of the present invention. At 201, a change of position of at least on part of a human body is sensed. As mentioned earlier, the change of position may include a change in the direction a human is facing or an orientation of one or more parts of the human body, for example. At 202, a first recognition set is selected based on the change in position. The change in position may indicate that a certain command set be used, for example. In one example, a human being raises his hand while playing a video game and the program selects a first recognition set. The first recognition set may look like the following.

{shield, stop, duck, jump, map}

At 203, a speech input is received. The speech input signal may be a digital signal representing an utterance which was spoken by the user. At 204, the speech input signal is recognized in the context of the first recognition set. For example, a human being playing the video game described above may have said "shield up". This speech may be compared against the first recognition set to recognize the phrase, for example. In this example the element "shield" may be the recognition result which may allow the character in the video game to be protected by a shield.

Figure 3:
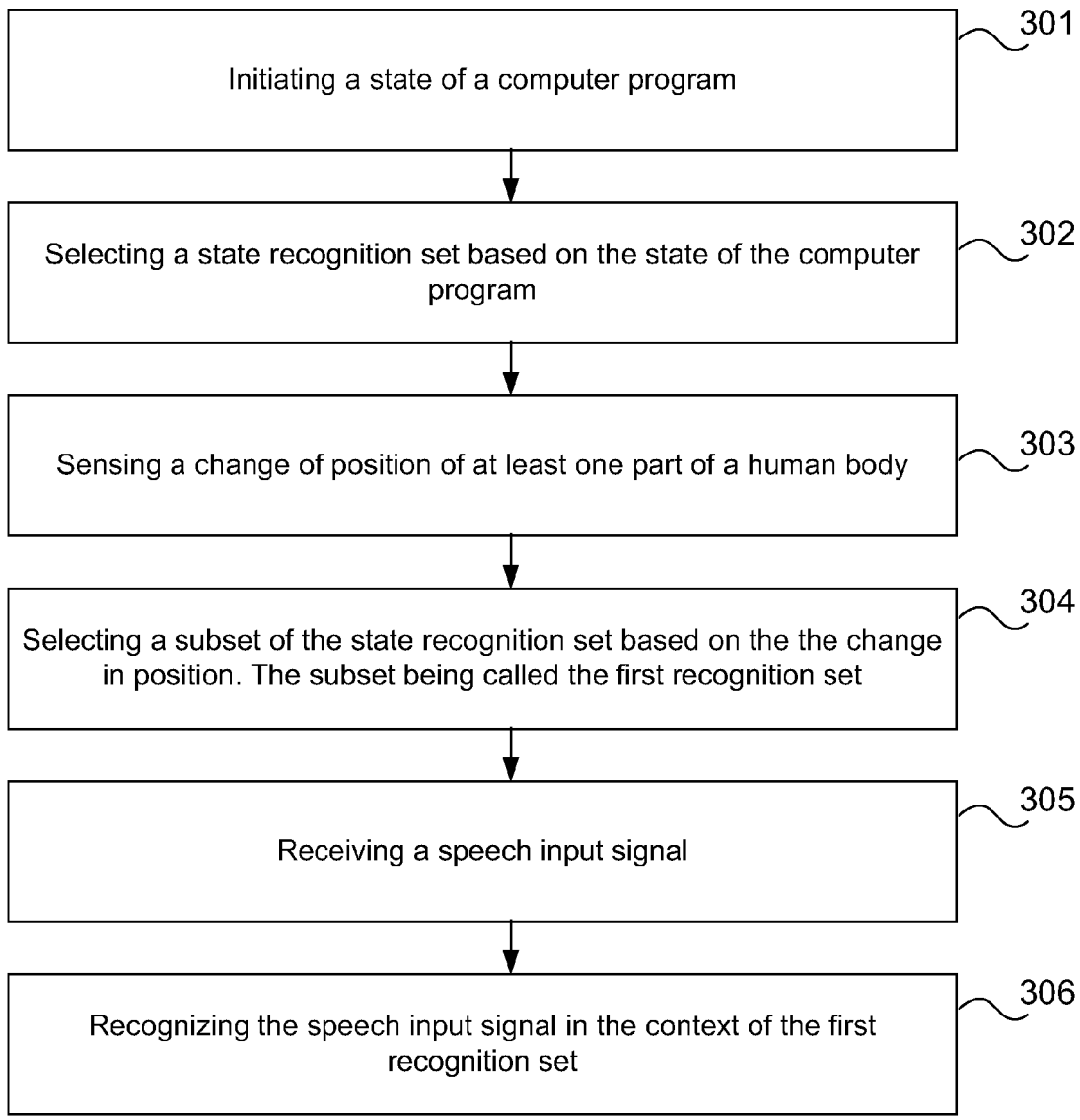
FIG. 3 illustrates another method for performing speech recognition using sensory inputs of human position according to one embodiment of the present invention.

FIG. 3 illustrates another method 300 for performing speech recognition using sensory inputs of human position according to one embodiment of the present invention. At 301, a state of a computer program is initiated. This may be a program sequence which is based on several previous inputs. For example, the video program mentioned above may initiate a state of the video game in which the user's character is making his way through a virtual forest. At 302, a state recognition set is selected based on the state of the computer program. The program may be at a point when only a limited number of options are available and in this way a recognition set may correspond to these options, for example. In the video game example, the user's character is making his way through a virtual forest and may have a state recognition set as follows.

{shield, stop, duck, jump, map, run, walk, left, right, sword, lance, climb tree, talk, ride, mount, borrow, steal, fire, call}

At 303, a change of position of least one part of a human body is sensed. This includes the examples of sensing a change of position mentioned previously. In the video game example, the user may change the position of his hand while holding a game sensor (e.g. a game sensor 502 illustrated in FIG. 5 below). He may hold the game sensor 502 up so that his fingers are substantially vertical to one another (510). At 304, a first recognition set is selected based on the change in position, wherein the first recognition set includes finding a subset of the state recognition set. In the video game example, the subset of the state recognition set above would be selected based on the change of position. In this case, the subset may look as follows.

{shield, stop, duck, jump, map}

This would be called the first recognition set in this example. At 305, a speech input is received. The speech input signal may be a digital signal representing a portion of an utterance which was spoken by the user. At 306, the speech input signal is recognized in the context of the first recognition set. For example, a human being playing the video game, described above, may have said "stop". This speech may be compared against the first recognition set to recognize the phrase, for example. In this example, the element "stop" may be the recognition result which may allow the character in the video game to stop walking or running within the virtual forest.

Figure 4:
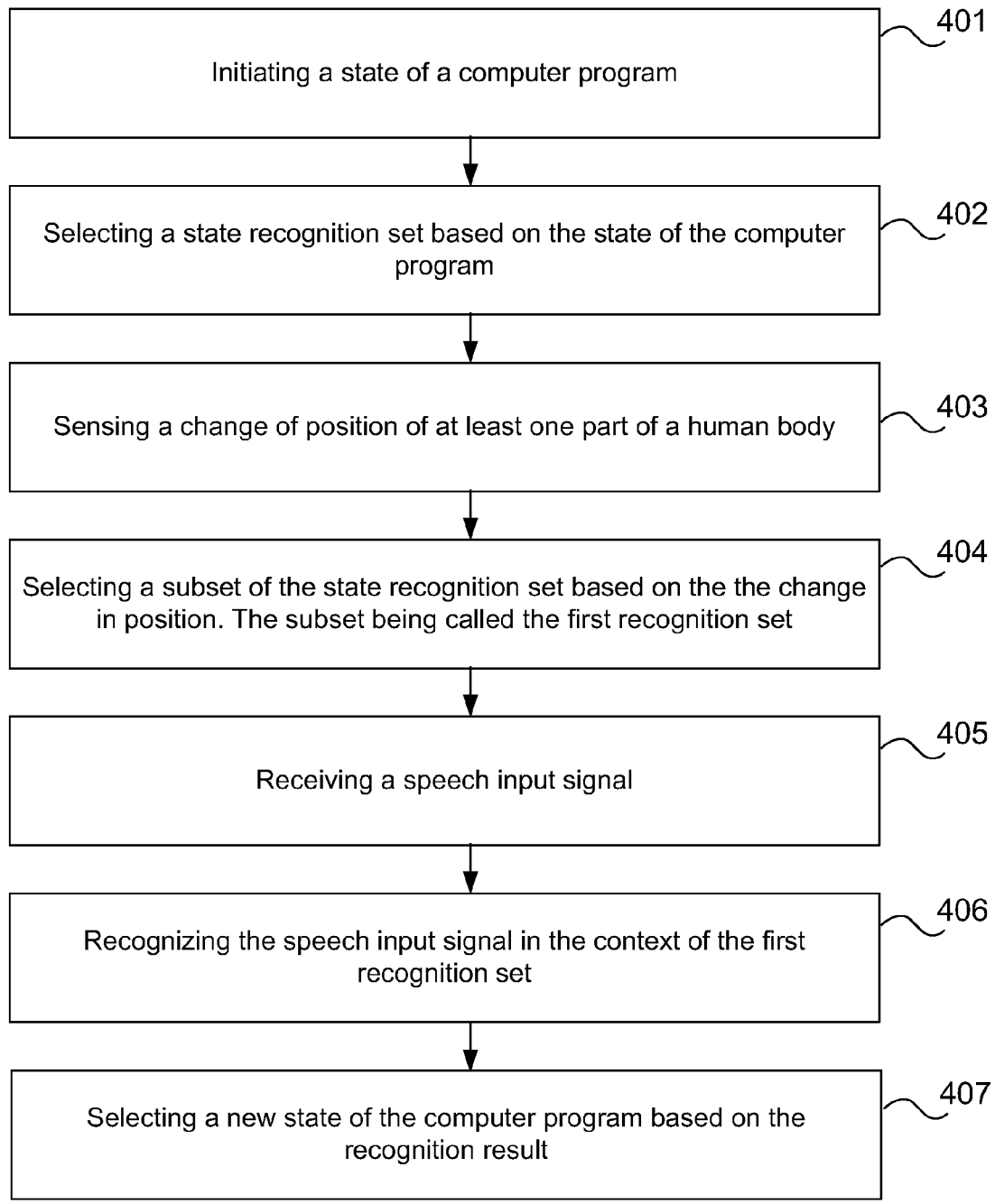
FIG. 4 illustrates another method for performing speech recognition using sensory inputs of human position according to one embodiment of the present invention.

FIG. 4 illustrates another method 400 for performing speech recognition using sensory inputs of human position according to one embodiment of the present invention. At 401, a state of a computer is initiated. This may be a program sequence which is based on several previous inputs. For example, the video program mentioned above may initiate a state of the video game in which the user's character is making his way through the courtyard of a virtual castle. At 402, a state recognition set is selected based on the state of the computer program. The program may be at a point when only a limited number of options are available and in this way a recognition set may correspond to these options, for example. In the video game example, the user's character is making his way through the courtyard of a virtual castle and may have a state recognition set as follows.

{shield, stop, duck, jump, map, run, walk, crawl, climb, up stairs, enter door, close door, enter window, close window, open crate, close crate, draw bridge, left, right, sword, knife, key, climb, talk, smile, sell, buy, call, lift veil}

At 403, a change of position of least one part of a human body is sensed. This includes the examples of sensing a change of position mentioned previously. In the video game example, the user may change the position of his hand while holding a game controller. He may hold the game sensor flat so that his palm is substantially facing down. At 404, a first recognition set is selected based on the change in position, wherein the first recognition set includes finding a subset of the state recognition set. In the video game example, the subset of the state recognition set above would be selected based on the change of position. In this case, the subset may look as follows.

{enter door, enter window, open crate, lift veil}

This may be called the first recognition set in this example. At 405, a speech input is received. The speech input signal may be a digital signal representing an utterance which was spoken by the user. At 406, the speech input signal is recognized in the context of the first recognition set. For example, a human being playing the video game described above may have said "enter door". This speech may be compared against the first recognition set to recognize the phrase, for example. At 407, a new state of the computer is selected based on the recognition result. In the video game example, the element "enter door" may be the recognition result which may prompt the video game to select a new state of the video game program based on the recognition result "enter door". This new state of the video game may be initiated and the program may display the room entered on the video screen. Also the video game program may select a new state recognition set based on the new state of the video game program and continue the method all over again.

Figure 5A:
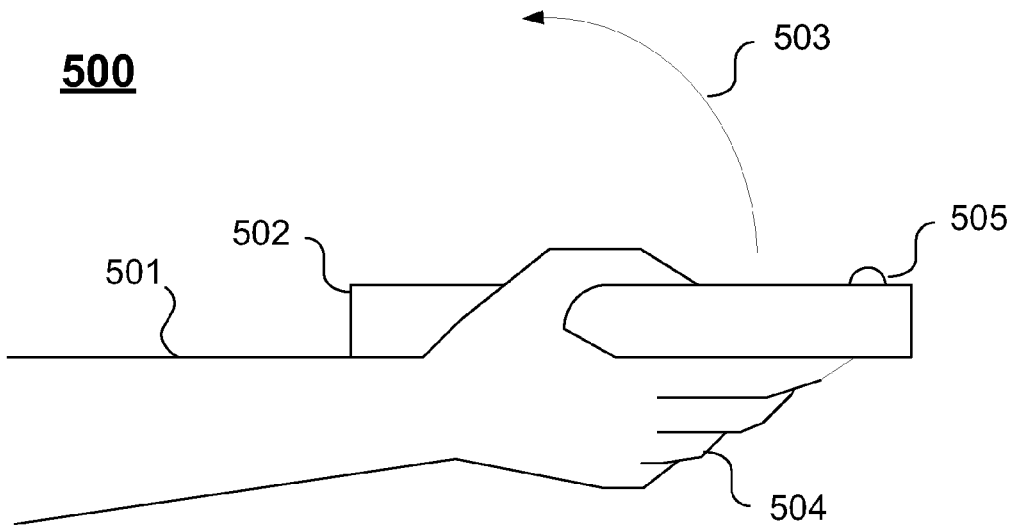
FIGS. 5A and 5B illustrates an example of how the position of a human hand may be used for performing speech recognition according to one embodiment of the present invention.
Figure 5B:
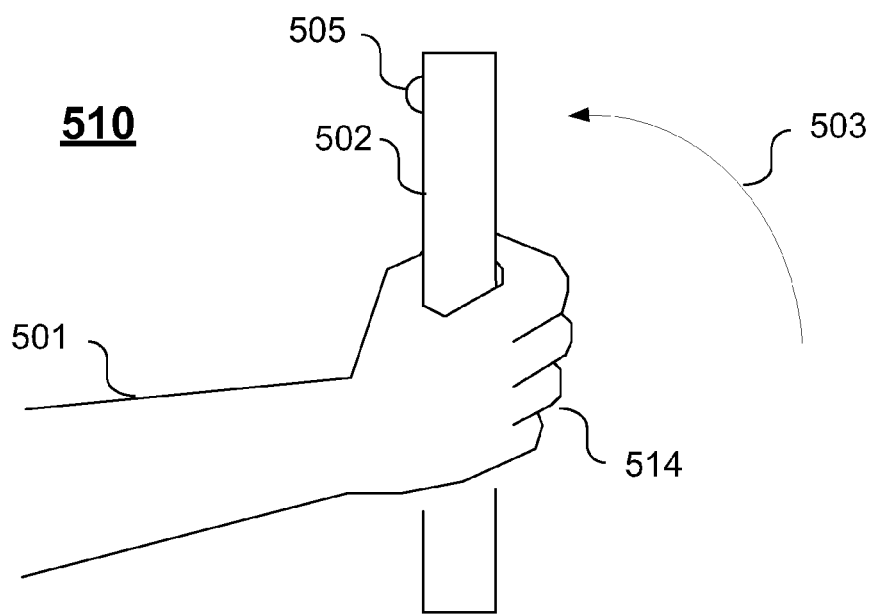

FIGS. 5A and 5B illustrates an example of how the position of a human hand may be used for performing speech recognition according to one embodiment of the present invention. FIGS. 5A and 5B includes human arm 501, game sensor 502, an indication of the direction of the change of position 503, a first orientation of a human hand 504, a second orientation of a human hand 514, and a microphone 505. When the hand has changed position from the first orientation of the human hand 504 to the second orientation of the human hand 514, the game sensor senses the change and the system may user this information to select a first recognition set. This sensor may be a gyroscope, for example. Again referring to the video game example, a first recognition set may look like the following.

{sword, lance, fire}

This first recognition set may be a subset of a state recognition set. This state recognition set may look like the following.

{shield, stop, duck, jump, map, run, walk, left, right, sword, lance, climb tree, talk, ride, mount, borrow, steal, fire, call}

This selection of a first recognition set has been described in methods 200, 300, and 400. The selection occurs at 202, 304, and 404, respectfully, in regards to this example. The speech enters microphone 505. This would be used at 203, 305, and 405 in the aforementioned methods along with appropriate electronic circuitry (amplifier, analog-to-digital converter, etc. . . . ) in order to receive a speech input signal. Next, the speech input signal is recognized in the context of the first recognition set. This has been described previously.

Figure 6A:
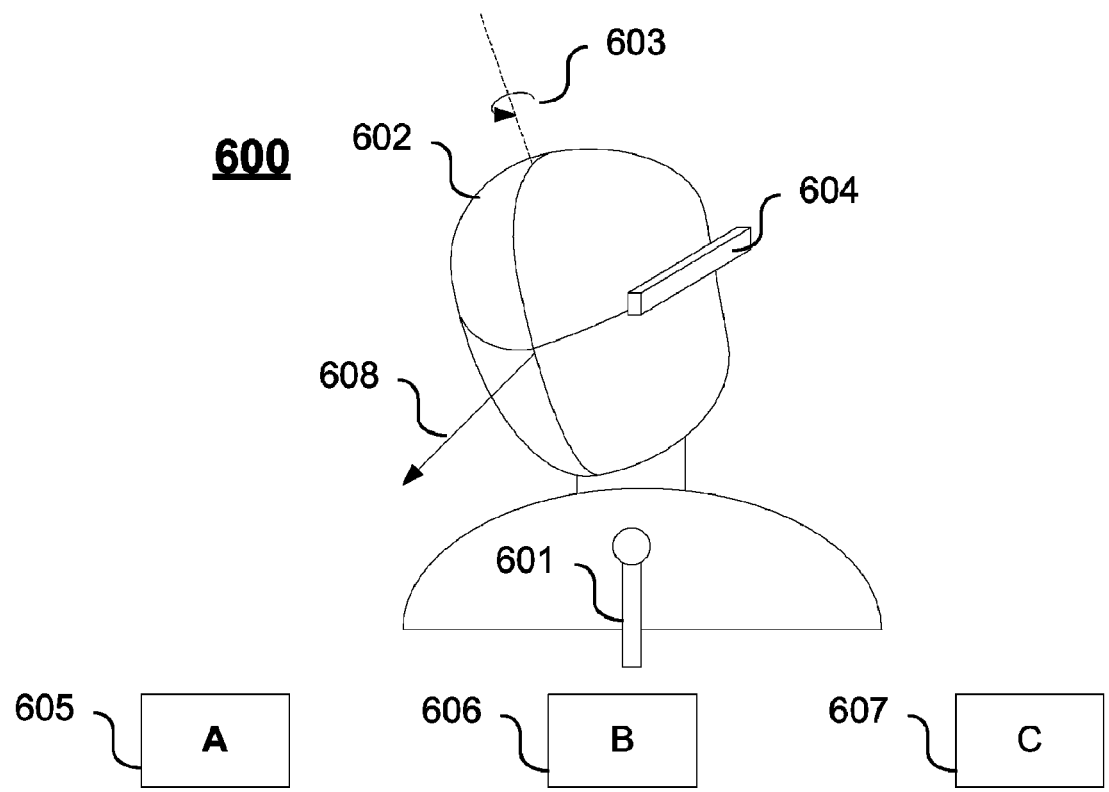
FIGS. 6A and 6B illustrates an example of how the position of a human head may be used for performing speech recognition according to another embodiment of the present invention.
Figure 6B:
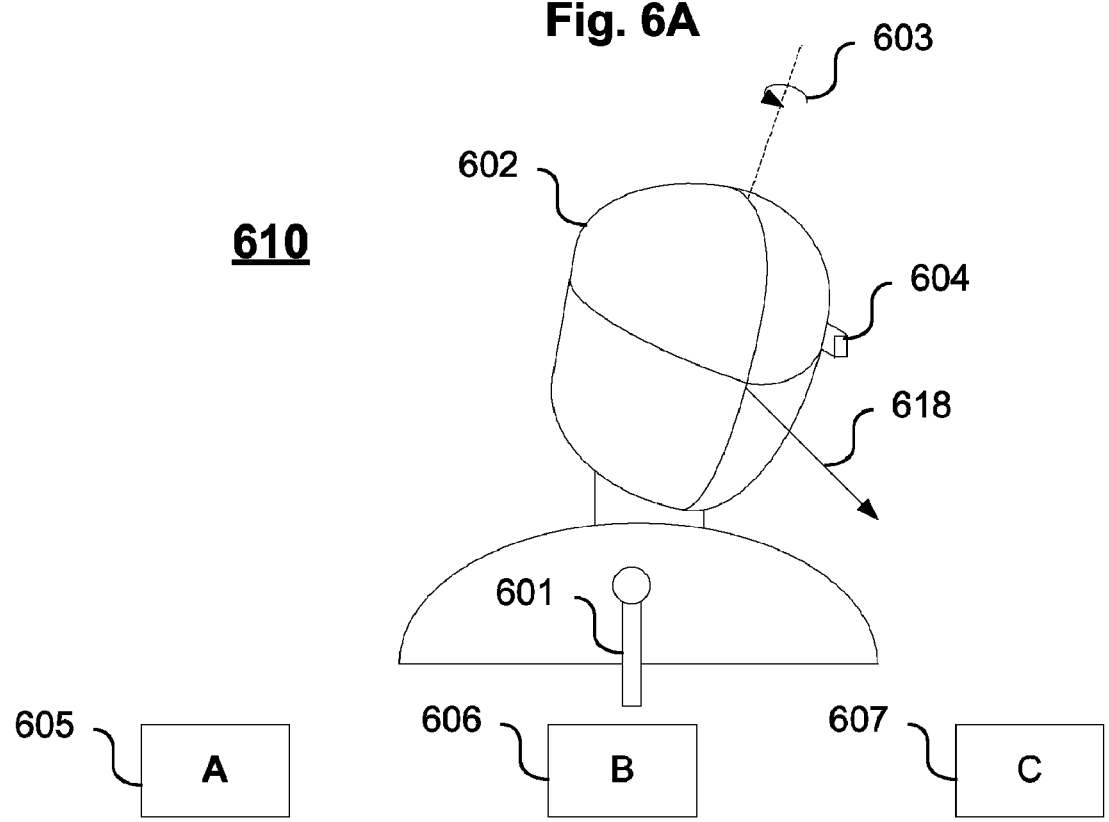

FIGS. 6A and 6B illustrates an example of how the position of a human head may be used for performing speech recognition according to another embodiment of the present invention. FIGS. 6A and 6B includes a microphone 601, a human head 602, a direction of rotation 603, a position sensing device 604 attached to said human head 602, instrument panel A 605, instrument panel B 606, instrument panel C 607, a first facing direction 608, and a second facing direction 618. In this embodiment, a human user having a human head 608 in a position 600 in which the human head is in the first facing direction 608 is speaking commands. Instrument panel A, B, and C may be panels which perform different functions in an automated manufacturing line, a monitoring station in a power plant, or a control room for a television broadcasting studio, for example. In this embodiment, position 600 is part of a first change in position. And according to this embodiment, a panel A recognition set has been selected based on a change to the first facing direction 608, and panel A recognition set includes commands associated with instrument panel A 605. In one example, instrument panel A 605 may be an instrument for controlling the lighting in a television studio and the panel A recognition set may look as follows.

{back lights, left lights, right lights, fade, up, down, sequence, one, two, three}

The human associated with said head 602 may say "back lights fade sequence two". Each segment of speech would be processed in the context of the panel A recognition set and the controls on the panel would command the lighting system to fade the back lights according to sequence two. This sequence may be a pre-programmed sequence which gives some desired affect in terms of how fast the back lights fade.

At some time the human associated with said head 602 may rotate in the direction 603 until said human head 602 is facing in the second facing direction 618. Sensor 604 would sense the change of position. And according to this example, a panel C recognition set may be selected based on a change to the second facing direction 618, and panel C recognition set includes commands associated with instrument panel C 607. In the television studio example, instrument panel C 607 may be an instrument for controlling the cameras in the television studio and the panel C recognition set may look as follows.

{front, camera, up, down, tilt, up, down, pan, left, right, sequence, one, two, three}

The human associated with said head 602 may say "left camera pan left left left". Each segment of speech would be processed in the context of the "panel A" recognition set and the controls on the panel may command the left camera to pan left three increments.

Figure 7:
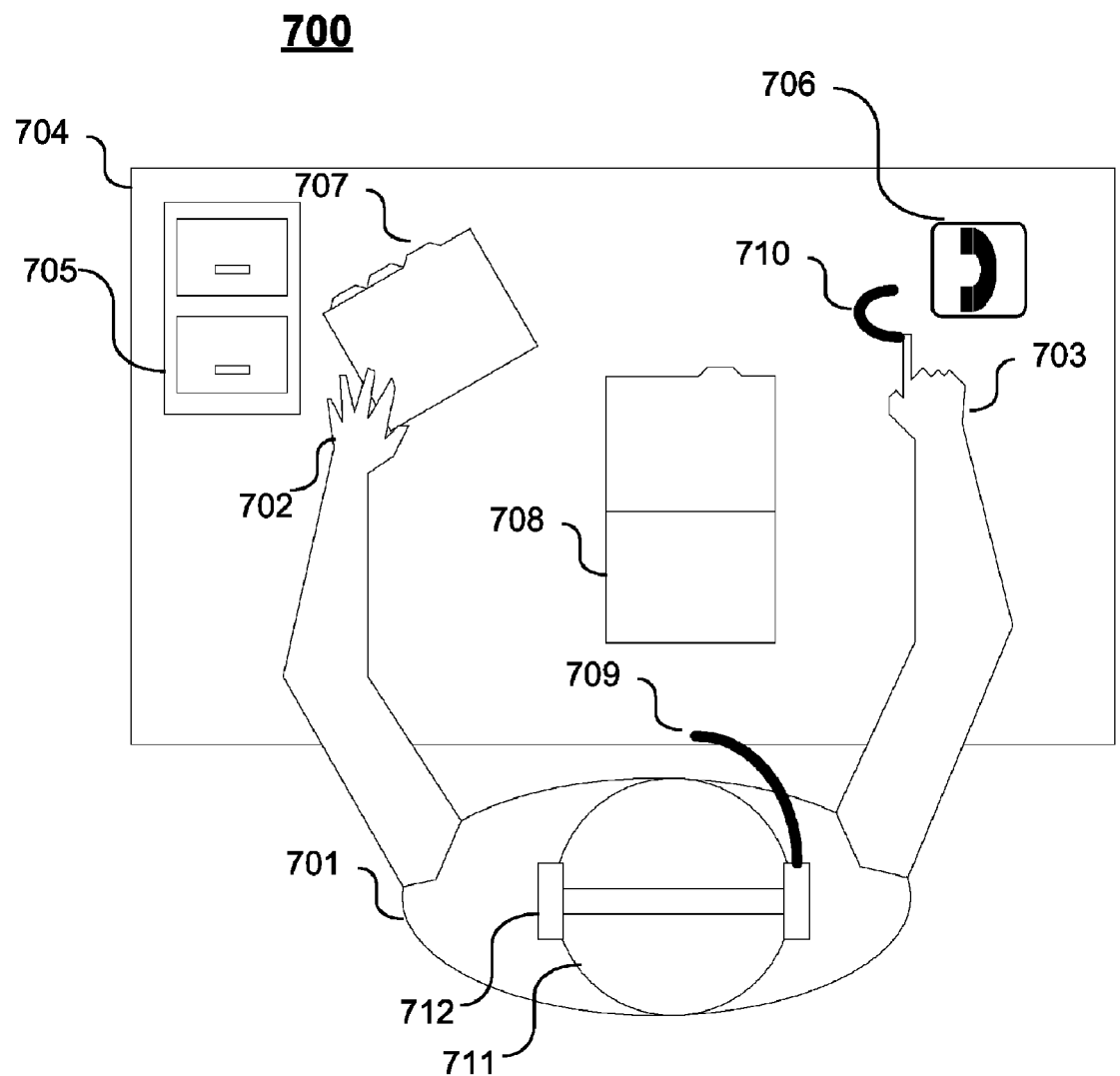
FIG. 7 illustrates another example of how the position of parts of a human body on a tactile screen may be used for performing speech recognition according to another embodiment of the present invention.

FIG. 7 illustrates another example of how the position of parts of a human body on a tactile screen may be used for performing speech recognition according to another embodiment of the present invention. This example, illustrates a surface computing application. FIG. 7 illustrates a scenario 700 which includes a human user 701, a tactile computer interface surface 704, and a microphone 709 attached to a headset 712. The human user 701 includes a left hand 702, a right hand 703, and a head 711. The human user 701 is wearing the headset 712 on his head 711. The tactile computer interface surface 704 may be integrated into a table or an office desk. Visible on the computer interface surface 704 is a virtual filing cabinet 705, a telephone symbol 706, a virtual stack of files 707, a virtual open file 708, and a shape 710 which denotes the sensing of a change of position of a portion of a human hand moving substantially along a portion of the tactile surface 704. This portion of the hand happens to be the index finger of the right hand 703 of the human user 701. In this example, the portion of the right hand is proximate with the computer interface surface 704. In this example, the change of position occurs within a three foot radius of an initial position of the at least one part of the human body.

In the scenario 700, human user 701 is manipulating the virtual stack of files 707 and reading the contents of the virtual open file 708. She realizes that something within the virtual open file 708 needs to be clarified and decides to call her client Carl Fiyel. She moves her right hand 703 to a portion of the tactile surface 704 proximate to the phone symbol 706. The tactile computer interface surface 704 senses the change of position. Since the change is in the vicinity of the phone symbol 706, a computer program selects a telephone recognition set. In this example the telephone recognition set may look as follows.

{call, redial, voicemail, line 1, line 2, hold, address book, home, Wilma, Peter Henry, Mom, Sister, Karl Nale, George Smith, Tom Jones, George Martinez, Carl Fiyel, Daniel Fihel, Marlo Stiles, Camp Fire Girls, Mario Stiles, Sara Chen, Larry Popadopolis, Nina Nbeheru, Macey Epstein, etc. . . . }

In this example, the people in the user's virtual telephone directory are part of the recognition set. If the human user 701 has many contacts, this set may contain hundred's of entries. The human user 701 now moves the index finger of her right hand 703 proximate with the tactile surface in a manner resembling the letter "C" 710. This change of position selects a snippet recognition set. This set may represent snippets or other types of segments of speech which correspond to the letter "C", for example. This set may look as follows.

{ca, ce, co, cu}

The human user 701 now utters the phrase, "Call Carl Fiyel" into microphone 709. A recognizer recognizes the resulting speech input signal in the context of the telephone recognition set and the snippet recognition set. First the recognizer may come up with an initial guess at the utterance, "Call Carl Fiyel". A possible first guess may be a set of ordered entries followed by the likelihoods associated with those entries. The top 5 entries may be part of this initial guess. The set may look as follows.

{Call Mario Stiles, 452,
Call Carl Fiyel, 233,
Call Camp Fire Girls, 230,
Call Daniel Fiyel, 52,
Call Karl Nale, 34}

Next, the snippet recognition set may be used to weight this set of likelihoods according to how well they match the sound segments associated with the letter "C". The resulting reordered set may look as follows.

{Call Carl Fiyel, 723,
Call Camp Fire Girls, 320,
Call Mario Stiles, 270,
Call Karl Nale, 143,
Call Daniel Fiyel, 125}

In this example, the recognizing of the speech input signal includes using the snippet recognition set to weight a set of likelihoods, wherein the snippet recognition set includes segments of speech. The highest weighted likelihood is taken as the recognition result and the system dials the number of Carl Fiyel located within a database accessible to the computer.

The human user talks to Carl Fiyel on headset 712 and clarifies the issue. The human user edits the virtual open file 708, closes the virtual file, and adds the file to the virtual stack of files 707. Since all the files relate to "D Industries", the human user 701 chooses to file them together. She moves the virtual stack of files 707 to the virtual filing cabinet 705. The tactile surface senses the change of position of the left hand 702 across the screen. The file manager program selects a file cabinet recognition set based on the motion of the left hand 702 and the state of the program running the system. The file cabinet recognition set may look as follows.

{file, other file, find, index, retrieve, copy, paste, subject, company, modified, created, owner, Walsh Industries, Company A, Company B, Firm C, D Industries, Miscellaneous Notes, Research Project A, Research Project B, George Smith, Tom Jones, George Martinez, Carl Fiyel, Daniel Fihel, Mario Stiles, George Form, Sara Chen, Larry Popadopolis, Macey Epstein, etc. . . . }

In this example, a file manager program has included all the information associated with the different operations a user may wish to perform with the virtual filing cabinet 705. The human user 701 utters "file D Industries". The system converts this utterance into two smaller portions. A first speech input signal includes "file" and a second speech input signal includes "D Industries". In this example, the first speech input signal is considered a command. A subset of the file cabinet recognition set is selected based on the fact that this is the first speech input signal. This command recognition set may look as follows.

{file, find, index, retrieve, copy, paste}

The first speech input signal is recognized in the context of the command recognition set for the file manager program. This results in the "file" element being chosen as the recognition result. The file manager program now initiates an inventory of other states within other programs running within the system. Since the command "file" has been recognized, the system determines which files have been removed from the filing cabinet and which files have been created during this session of use and a scenario recognition set is selected which would include the possible choices for what the user may want to file. This scenario recognition set may look as follows.

{D Industries, Miscellaneous Notes, Carl Fiyel, Daniel Fihel, new, other}

There are six possibilities in filing this stack of files 707. The second speech input signal is recognized in the context of the scenario recognition set. "D Industries" element is chosen as the recognition result. This may result in selecting a new the state of a file manager program and initiating a routine within this new state. This may include storing the stack of files 707 into the "D Industries" folder. Initiating a new state of the file manager program may begin the method of selecting another recognition set based on the new state of the file manager program.

Figure 8:
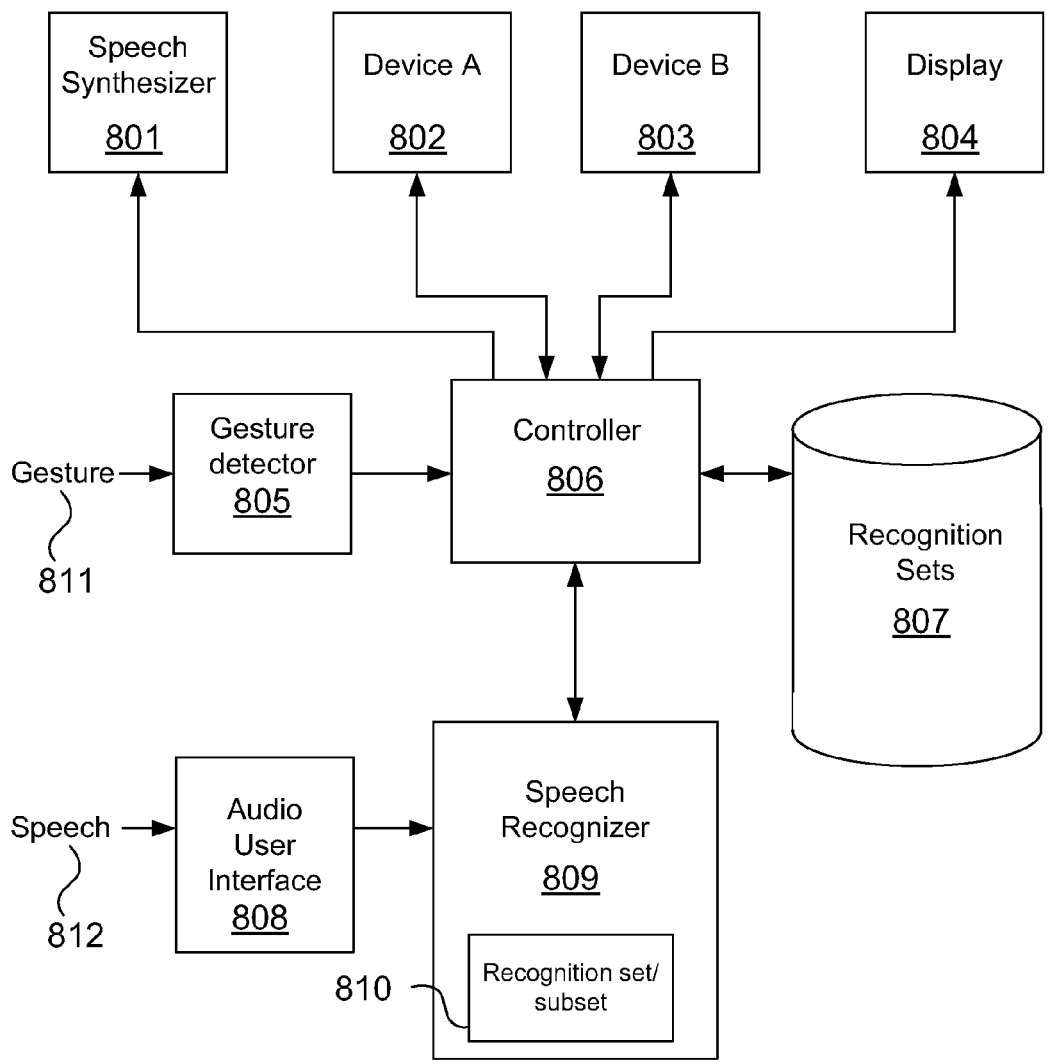
FIG. 8 illustrates a system 800 for performing speech recognition using gestures according to one embodiment of the present invention.

FIG. 8 illustrates a system 800 for performing speech recognition using gestures according to one embodiment of the present invention. System 800 includes speech synthesizer 801, device A 802, device B 803, display 804, gesture detector 805, controller 806, a repository of recognition sets 807, an audio user interface 808, and a speech recognizer 809. System 800 utilizes speech 812 and gesture 811 to control device A (802), device B (803), or both.

The gesture detector 805 may provide signals to the controller corresponding to a gesture 811. For example, gesture detector 805 may be a group of infrared detectors. Each detector may emit a narrow beam of light in the infrared spectrum and sense the reflected beam. The duration and timing of the sensed reflection may be used to determine general direction and formation of the gesture 811.

Controller 806 may process data provided from gesture detector 805 in order to determine the gesture 811 from a set of gestures. For example, the set of gesture may include gestures involving the moving of the human hand in different directions, moving the hand at different rates of speed, forming the hand into different configurations, or any combination thereof. As another example, a flat hand gesture from left to right may correspond to a main menu. As yet another example, fast moving hand gesture moving to and fro may indicate a cancellation of the last request. As another example, a flat hand with stretched out fingers slowly moving across a gesture detection area (i.e. an area were gestures may be received by the gesture detector 805) may indicate the user wishes to find directions. For example, a grabbing hand gesture that includes having a hand with fingers open and then suddenly closing into a closed fist may indicate the user wishes to make a phone call.

Controller 806 may initiate a state of a program as a result of determining gesture 811. This state of the program may instruct controller 806 to select a recognition set from repository 807 or another storage location (e.g. DRAM, cache, or hard disk) that corresponds to the determined gesture and then load speech recognizer 809 with recognition set 810 (as shown). Each gesture in the detectable set of gestures may correspond to a recognition set located in the repository of recognition sets 807.

Controller 806 may send data to display 804 to indicate the possible choices available to the user at this state of the program or may simply display a visual cue that indicates the gesture has been determined and speech input is expected. The program may also instruct controller 806 to send data to the speech synthesizer 801 to give the user a verbal prompt.

The user may respond to a provided prompt or visual cue with speech 812. The audio user interface 808 may convert the speech to digital signals so that speech recognizer 809 may be able to use the digital signals to recognize the speech in the context to loaded recognition set 810.

The state of the program may be changed in response to the recognized speech. The new state of the program may instruct controller 806 to interface with device A (802), device B (803), or both. Device A (802) and Device B (803) may be a temperature control, an audio system control, a phone control, a computer, a Global Positioning Satellite (GPS) device, or any of a variety of devices that may be electronically controlled. A plurality of devices may need to be communicated with in order to respond to a user's request and the state of the program corresponding to the recognition set. Device A (802) and device B (803) represent a plurality of devices which may be controlled individually or in concert with one another.

For example, the user may be driving in an automobile equipped with a speech recognition system according to one embodiment of the present invention. The user may motion their hand from left to right (i.e. a gesture) in front of a control panel. This gesture 811 may be determined by the controller 806 as being one gesture in a detectable set of gestures. In response, controller 806 may power a red LED (light emitting diode) which gives the user a visual cue that the gesture was determined. This may initiate a new state of a program and controller 806 may load the following recognition set into speech recognizer 809 corresponding to the elements of a main menu. The recognition set may look as follows.

{Phone, Audio, Search, GPS, Air Conditioner, directions}

System 800 may also provide a prompt to the user by synthesizing speech such as, "Main menu".

Speech recognizer 809 may be enabled to begin recognizing speech at this time. After the prompt (i.e. "Main Menu") is given, the user may reply be saying, "directions".

Audio user interface 808 receives speech 812. The speech may be converted into a digital format and may be sent to speech recognizer 809 for recognition. Speech recognizer 809 may utilize recognition set 810. The process of recognition may include selecting the most likely candidate from the recognition set 810. Speech recognizer 809 may provide recognition results to controller 806. These recognition results may indicate which element in the recognition set has been recognized. These recognition results may include data. For example, the recognition results may provide a list of candidates and their associated likelihoods.

The display and the green LED may give visual cues to the user that the speech was recognized. For example, controller 806 may indicate the speech was recognized by powering a green LED at this time. Also, controller 806 may send data to display 804 to show a local map.

Controller 806 may select a new state of the program based on the recognition result. The new state of the program may instruct controller 806 to select a new recognition set corresponding to the new state of the program which look as follows.

{Home, gas station, park, address, yellow pages}

This new state of the program may also instruct controller 806 to send data to speech synthesizer 801 to say, "Destination Please"

Next the user may say,

"gas station".

The speech may again be converted to digital and recognized in the context of the new recognition set. In this case the recognition result may be the selection of the "gas station" element of the recognition set. Again, controller 806 may select a new state of the program based on the recognition result. This new state of the program may utilize device A (802) which may be a Global Position Satellite (GPS) device to find the nearest gas station.

Figure 9:
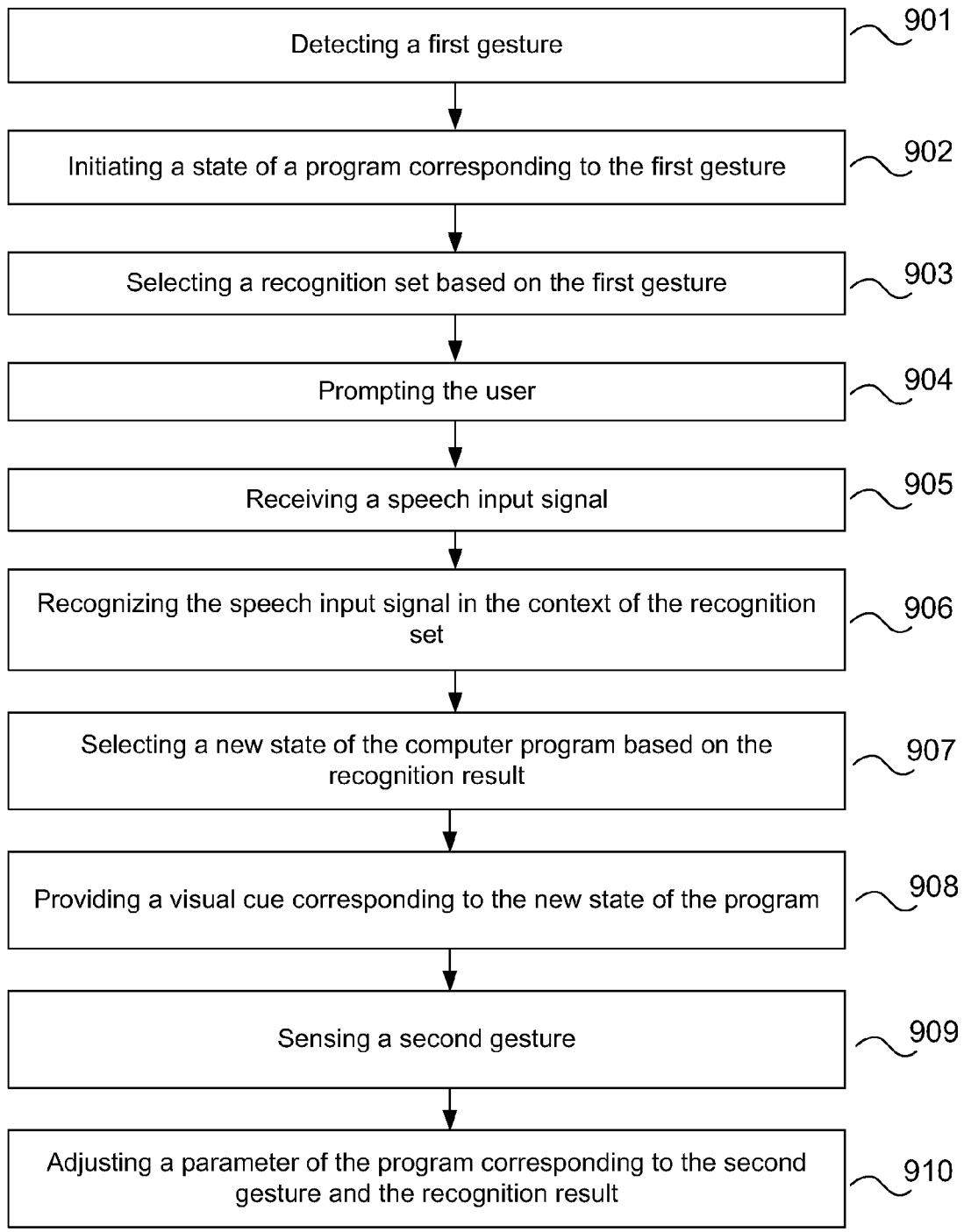
FIG. 9 illustrates a method for performing speech recognition using gestures according to one embodiment of the present invention.

FIG. 9 illustrates a method 900 for performing speech recognition using gestures according to one embodiment of the present invention.

At 901, a first gesture is detected. This may be a gesture from a set of predetermined gestures as described earlier. This may be a hand gesture and detecting the hand gesture may be detecting a portion of the hand such as a finger, for example. The gesture may include motion.

At 902, a state of a program may be initiated corresponding to the first gesture. This may include initiating a program corresponding to the gesture. The program may reduce the level of sound generation such as turning down the volume on a loudspeaker, for example. This may be done in order to reduce extraneous sounds in preparation for speech recognition.

At 903, a recognition set corresponding to the first gesture may be selected. The recognition set may be loaded into a recognizer as described earlier.

At 904, the user is prompted. For example, a voice may list the options available from the recognition set.

At 905, the speech input is received.

At 906, the speech is recognized in the context of the recognition set. The recognition may result in a recognition result. The recognition result may include an element of the recognition set.

At 907, a new state of the computer program may be selected based on the recognition result. This may allow for additional prompting of the user, loading a new recognition set, executing a subprogram, or any combination thereof.

At 908, a visual cue may be provided. The visual cue may correspond to the new state of the program. For example, the speech may have been recognized and a green LED may be powered to indicate that the new state of the program has been reached (e.g. the speech input has been recognized).

At 909, a second gesture may be detected. This second gesture may also be a gesture in a set of gestures or may be gesture in a set of gestures which are particular to the state of the program.

At 910, a parameter of the program corresponding to the second gesture and the recognition result may be adjusted. For example, the user may have said, "temperature" and the new state of the program may now allow the user to gesture in an up and down manner to signify that the thermostat for the air conditioning should be increased or decreased. The up and down gesture and the recognition of "temperature" has adjusted the parameter of temperature to be incremented up or down.

Figure 10:
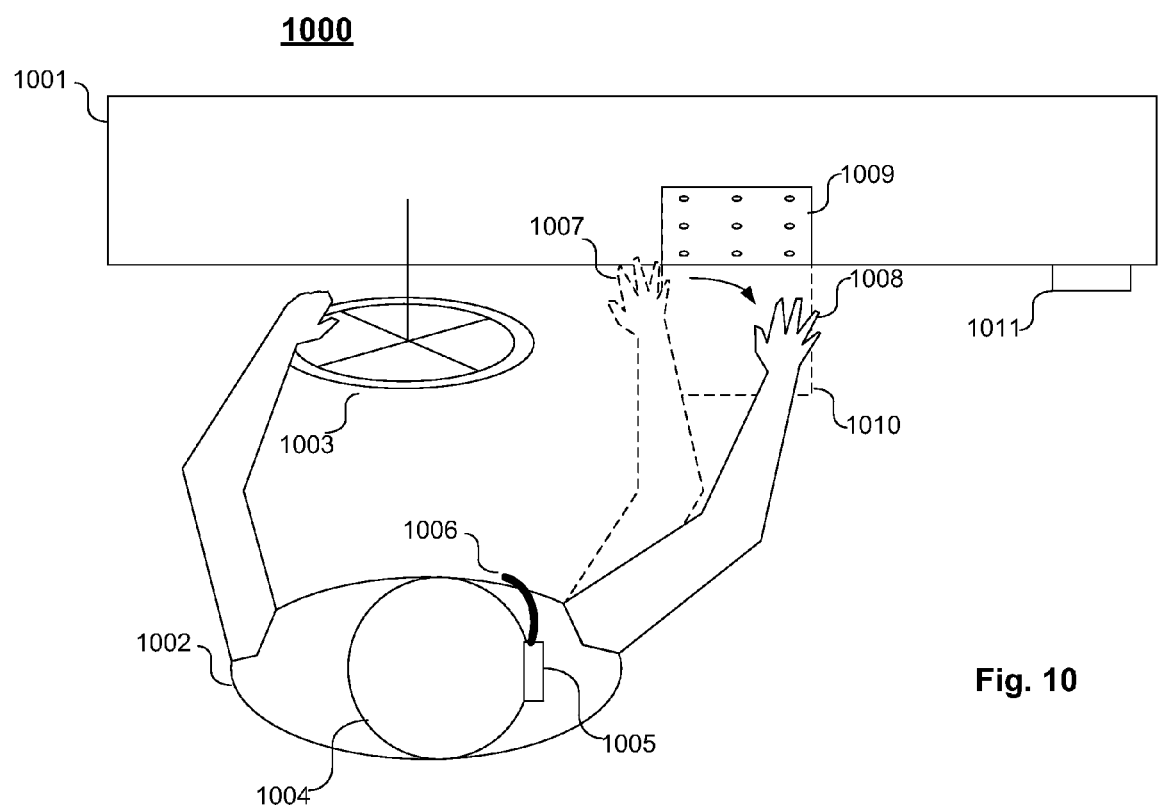
FIG. 10 illustrates an automobile cabin interior which is outfitted for performing speech recognition using gestures according to one embodiment of the present invention.

FIG. 10 illustrates an automobile cabin interior 1000 which is outfitted for performing speech recognition using gestures according to one embodiment of the present invention. Automobile interior cabin 1000 includes dashboard 1001, human 1002, steering wheel 1003, hands free set 1005, control panel 1009, gesture detection area 1010, and hands free module 1011. A speech recognition system utilizes hands free set 1005, control panel 1009, and hands free module 1011. Human 1002 having head 1004 is using hand gestures and speech to make a request.

Human 1002 makes a hand gesture. At first the right hand of human 1002 is in position 1007 indicated by dashed lines. Then the right hand of human 1002 moves to the right to position 1008 across sensor area 1010. The control panel 1009 detects the gesture.

The control panel 1009 may include sensors for detecting the gestures preformed in gesture detection area 1010. The gesture detector may include an array of infrared sensors which respond to the reflection of a narrow beam of infrared light which may be emitted from an LED at approximately the same location. Alternatively, image based gesture recognition may be used. In this embodiment the sensors may be one or more digital cameras. The image may be processed to determine the gestures from the images stored on the camera(s).

The motion depicted by hand position 1007 moving to position 1008 may indicate the user wishes to make a phone call. In this example, the control panel sensors create signals which are processed to determine the gesture from a possible group or set of gestures. A blue LED may be powered to indicate the gesture was determined. The determined gesture may be communicated from the control panel 1009 to hands free module 1011. This communication may occur across a private area network (PAN) such as Bluetooth. In this case the hands free module may be a cellular phone. Control of the transaction of this request may be passed over to the hands free module 1011 which may load a recognition set corresponding to making a phone call.

The hands free module 1011 may initiate a new state of a program in which a prompt is sent to hands free set 1005 to indicate that the system requires more information. The prompt may say, "phone ready".

The human 1002 may use microphone 1006 and respond by saying,

"Call mom".

The hands free module 1011 may receive the response and recognize the speech in the context of the loaded recognition set. The recognized speech may initiate a new state of the program to make the requested call to "mom". A control signal may be sent to control panel 1009 to light a green LED to indicate the response was recognized.

In an alternate embodiment, the control panel 1009 may detect the gestures and recognize the speech. For example, human 1002 may be talking to a person on a cellular phone and may wish to reduce the temperature of the air conditioning. In this case, human 1002 may use a gesture and control panel 1009 may detect the gesture. The detection of the gesture may initiate a new state of a program and control panel 1009 may load a recognition set corresponding to the automobile's climate control. The following may be an example of such a recognition set.

{temperature, fan up, fan down, heater up, heater down, air conditioner up, air conditioner down})

Control panel 1009 may prompt the user for input by synthesizing speech. The speech may be transmitted to the headset or may be broadcasted over the automobile's internal speakers. The prompt may announce, "climate control ready."

The user may respond,

"air conditioner down."

Control panel 1009 may receive the speech data from the headset 1005 and recognize the speech. The control panel may lower the air conditioning temperature by 2 degrees and indicate the recognition of the speech by synthesizing a response such as, "Air conditioning lowered."

Initially the cellular phone (i.e. the hands free module 1011) and the headset 1005 may form a PAN with control panel 1009. After control panel 1009 detects the gesture, control panel 1009 may reconfigure the wireless network (i.e. PAN) such that the incoming audio (i.e. the phone audio) is still received by the user and the user speech from the microphone 106 is received by the recognizer within control panel 1009. The user may have cancelled the request at any time by providing the corresponding hand gesture.

Figure 11A:
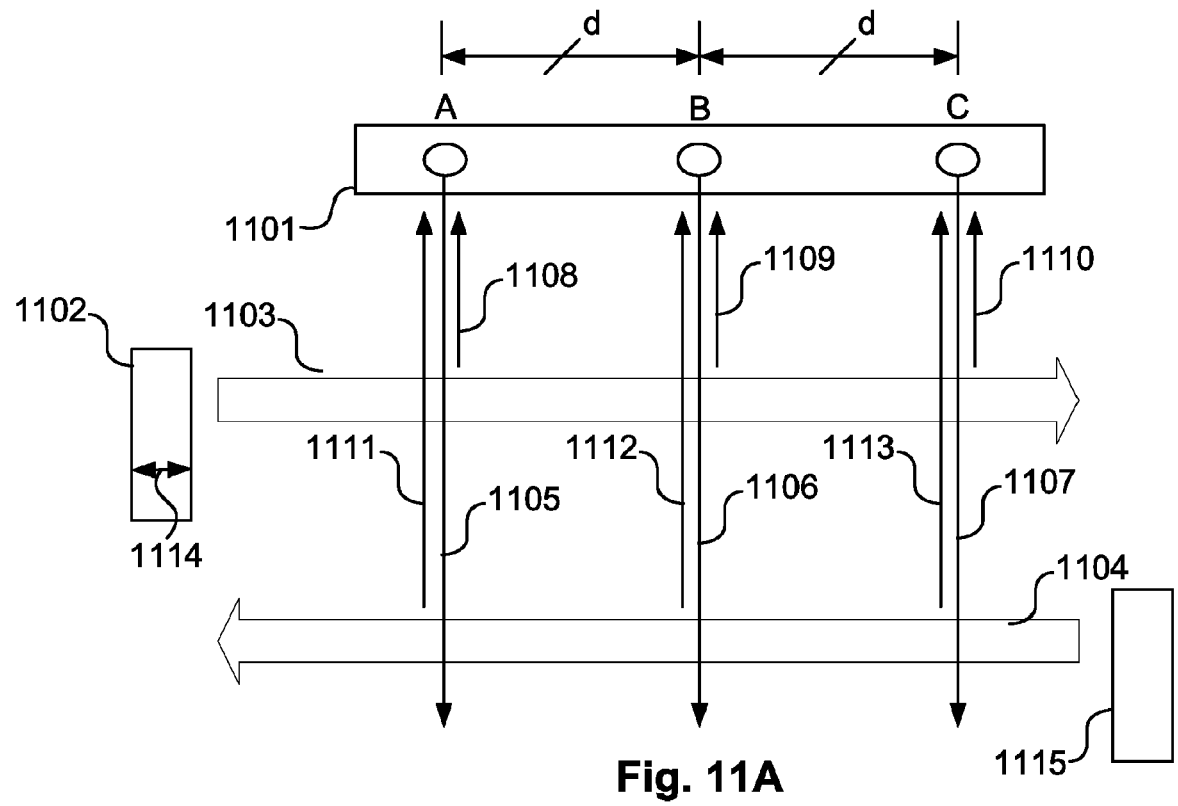
FIGS. 11A and 11B illustrates an infrared detection array in operation according to one embodiment of the present invention.
Figure 11B:
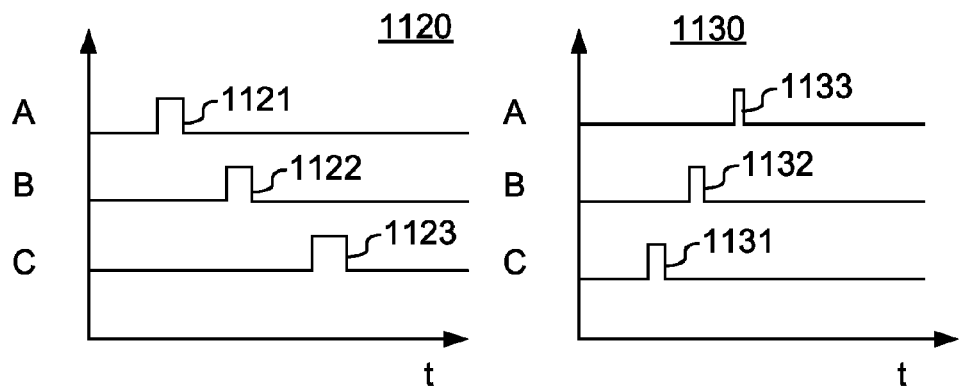

FIGS. 11A and 11B illustrates an infrared detection array 1001 in operation according to one embodiment of the present invention. Infrared detector array 1101 includes detector A, B, and C. Each detector emits a narrow infrared beam (e.g. beam 1105, 1106, and 1107).

Object 1102 provides an obstruction to beam 1105, 1106, and 1107 as it travels in direction 1103. Object 1102 may reflect beam 1105, 1106, and 1107 and result in reflected beam 1108, 1109, and 1110 (respectively). These reflected beams are sensed by detectors A, B, and C. FIG. 11B illustrates graph 1120 ofthe sensed reflected signals (i.e. 1121, 1122, 1123) through time as object 1012 travels in direction 1103.

Object 1115 provides an obstruction to beam 1107, 1106, and 1105 as it travels in direction 1104. Object 1115 may reflect beam 1107, 1106, and 1105 and result in reflected beam 1113, 1112, and 1111 (respectively). These reflected beams are sensed by detectors C, B, and A. FIG. 11B illustrates graph 1130 ofthe sensed reflected signals (i.e. 1131, 1132, 1133) through time as object 1115 travels in direction 1104. Object 1115 is the same shape as object 1102 in this example.

Graph 1120 and 1130 show different signals. Signals 1121-1123 show object 1102 moving at a first speed in direction 1103, and signals 1131-1133 show object 1115 moving at a second speed in the 1104 direction. The second speed of object 1115 is greater than the first speed of object 1102. The width of the signals and the spacing in time between them may be related to the speed of motion and width 1114 of object 1102. Direction and speed may be used to define the gesture. For example, the pulses generated by a fast moving hand in direction 1103 and then in direction 1104 may indicate a cancellation of the last command. Alternatively a slowing moving hand in direction 1103 may generate a signal that indicates a phone call is requested and the recognition set for initiating a phone call will be loaded and used to determine the destination of the call.

Signals 1121-1123 and 1131-1133 are illustrated to show the detection of speed and direction. The actual signals may vary. For example, reflections from beams 1105-1107 may be reflected in different angles with different powers such that signal A, signal B, and signal C of graph 1120 and 1130 may have perturbations through time. The direct reflections may be more powerful and of a longer duration and may be differentiated from the perturbations. The power of the reflected signal may be related to the power of the beam (i.e. beam 1105-1007), the distance object 1102 is from the sensor, or both.

Object 1102 may be a human hand or a human finger making a gesture. In one embodiment a hand gesture with closed fingers moving in direction 1103 may create a different set of signal than a hand gesture with open fingers moving in direction 1103. The number of pulses may increase depending on the number of fingers which passed over each of the detectors (i.e. A, B, and C). In another embodiment, the array of sensors form a 12 by 12 matrix in two dimensions. In this embodiment, the user may make gestures which may or may not have motion associated with them. An array of infrared detectors may be used to detect both stationary hand gestures or moving hand gestures, for example.

The gesture detector may utilize any number of technologies. These technologies may include touch screens, motion detectors, proximity detectors, accelerometers, angle detectors, up-down sensors, audio sensors, olfactory sensors, magnetic detectors, infra-red detectors, or radio frequency detectors. These technologies may include sensors which sense heat, light, capacitance, resistance, or other physical parameters. Sensors may include sensors which may work in concert and may detect a person sitting in a car seat, for example.

The following illustrates a method 1200 for performing speech recognition using gestures according to another embodiment of the present invention.

A first gesture is detected. This may be a gesture from a set of predetermined gestures as described earlier. This may be a hand gesture and detecting the hand gesture may be detecting a portion of the hand such as a finger, for example. The gesture may include motion.

A state of a program may be initiated corresponding to the first gesture. This may include initiating a program corresponding to the gesture. The program may reduce the level of sound generation such as turning down the volume on a loudspeaker, for example. This may be done in order to reduce extraneous sounds in preparation for speech recognition.

The speech input is received.

The speech input is recognized in the context of the recognition set. The recognition may result in a first recognition result. The recognition result may include an element of the recognition set.

The first recognition result is weighted according to a function associated with the gesture. For example, the user may wish to adjust a side mirror of an automobile and may say "adjust left", and motion with a gesture to the left. The recognition set associated with this example may include the following items.

{adjust up, adjust down, adjust left, adjust right, first position, second position, new station, volume up, volume down, radio on, mute, seat forward, seat back, cruise control on, cruise control off}

The elements may be weighted according to a function associated with the gesture. The first recognition result may include the following.

{adjust down, adjust up, adjust left, adjust right}

The weighting may result in the following elements and their associated liklihoods.

"adjust down" 23
"adjust up" 34
"adjust left" 300
"adjust right" 26

A second recognition result is determined. The second recognition result may be based on the weighting 1205. From the example of weighting 1205 above, the first recognition result may be ordered according to the greatest likelihood score to the least and result as follows.

"adjust left" 300
"adjust up" 34
"adjust right" 26
"adjust down" 23

The highest likelihood score of 300 for the element "adjust left" may be chosen as the second recognition result. Other criterion may be utilized such as the separation of the top likelihood score from the next highest in determining the second recognition result.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A speech recognition method comprising:
   initiating, by a computer system, a state of a computer program;
   selecting, by the computer system, a state recognition set based on the state of the computer program;
   detecting, by the computer system a gesture of at least one part of a human body;
   selecting, by the computer system, a first recognition set based on the gesture, the first recognition set being a subset of the state recognition set;
   receiving, by the computer system, a speech input signal; and
   recognizing, by the computer system, the speech input signal in the context of the first recognition set, the recognizing resulting in a recognition result.

2. The method of claim 1 wherein the gesture is a hand gesture, wherein the step of detecting the gesture includes detecting a portion of a human hand.

3. The method of claim 1 wherein the gesture includes motion.

4. The method of claim 1 wherein the step of detecting includes the use of infrared light emissions.

5. The method of claim 1 wherein the gesture is from a set of gestures corresponding to a plurality of recognition sets, wherein each recognition set corresponds to at least one gesture in the set of gestures.

6. The method of claim 1 wherein the recognizing includes using the first recognition set to weight a set of likelihoods, wherein the first recognition set includes segments of speech.

7. The method of claim 1 further comprising reducing a level of sound generation in response to the step of detecting the gesture.

8. The method of claim 1 further comprising:
initiating a new state of the computer program based on the recognition result; and
selecting a new state recognition set based on the new state of the computer program.

9. The method of claim 8 further comprising providing a visual cue corresponding to the new state of the computer program.

10. The method of claim 9 further comprising detecting a second gesture.

11. The method of claim 10 further comprising adjusting a parameter of the computer program corresponding to the second gesture.

12. The method of claim 1 further comprising providing a voice prompt corresponding to the gesture.

13. A speech recognition system comprising:
a controller;
a gesture detector coupled to provide signals to the controller, the signals corresponding to a gesture;
a speech recognizer having access to a plurality of recognition sets, the speech recognizer coupled to provide recognition results to the controller;
an audio user interface coupled to receive a speech input and coupled to provide audio signals to the speech recognizer, the audio signals corresponding to the speech input; and
a plurality of output devices coupled to the controller,
wherein a recognition set is selected from the plurality of recognition sets based on the gesture,
wherein the recognition results are generated based on the speech input and the selected recognition set,
wherein each recognition set in the plurality of recognition sets is associated with an output device in the plurality of output devices, and
wherein the controller provides signals to the output device associated with the selected recognition set, the signals corresponding to the recognition results.

14. The system of claim 13 wherein the gesture detector includes a plurality of infrared detectors arranged to provide signals corresponding to the gesture.

15. The system of claim 13 wherein at least a portion of the plurality of output devices are coupled through a wireless network.

16. The system of claim 13 wherein at least one of the output devices of the plurality of output devices is a speech synthesizer that provides a verbal prompt corresponding to the gesture.

17. A speech recognition method comprising:
initiating, by a computer system, a state of a computer program;
selecting, by the computer system, a state recognition set based on the state of the computer program;
detecting, by the computer system a gesture of at least one part of a human body;
receiving, by the computer system, a speech input signal; and
recognizing, by the computer system, the speech input signal in the context of a recognition set, the recognition set being a subset of the state recognition set, the recognizing resulting in a first recognition result;
weighting, by the computer system, the first recognition result according to a function associated with the gesture; and
determining, by the computer system, a second recognition result based on the weighting.

18. The method of claim 17
wherein the computer program includes the function associated with the gesture.

19. The method of claim 17 wherein the gesture is a hand gesture, wherein the step of detecting the gesture includes detecting a portion of a human hand.

20. The method of claim 17 wherein the gesture includes motion.

21. The method of claim 17 wherein the step of detecting includes the use of infrared light emissions.

22. The method of claim 17 wherein the gesture is from a set of gestures corresponding to a plurality of functions, wherein each function corresponds to at least one gesture in the set of gestures.

23. A system comprising:
an automobile; and
a speech recognition system in a cabin of said automobile, the speech recognition system comprising,
a controller,
a gesture detector coupled to provide signals to the controller, the signals corresponding to a gesture,
a speech recognizer having access to a plurality of recognition sets, the speech recognizer coupled to provide recognition results to the controller,
an audio user interface coupled to receive a speech input and coupled to provide audio signals to the speech recognizer, the audio signals corresponding to the speech input, and
a plurality of output devices coupled to the controller,
wherein a recognition set is selected from the plurality of recognition sets based on the gesture,
wherein the recognition results are generated based on the speech input and the selected recognition set,
wherein each recognition set in the plurality of recognition sets is associated with an output device in the plurality of output devices, and
wherein the controller provides signals to the output device associated with the selected recognition set, the signals corresponding to the recognition results.

* * * * *